(12) United States Patent
Hou

(10) Patent No.: US 7,643,278 B2
(45) Date of Patent: Jan. 5, 2010

(54) ELECTRONIC DEVICE AND KEYBOARD THEREOF

(75) Inventor: Wen-Kuang Hou, Miaoli County (TW)

(73) Assignee: Darfon Electronics Corp., Taoyuan (TW)

( * ) Notice: Subject to any disclaimer, the term of this patent is extended or adjusted under 35 U.S.C. 154(b) by 183 days.

(21) Appl. No.: 11/833,137

(22) Filed: Aug. 2, 2007

(65) Prior Publication Data

US 2008/0030934 A1 Feb. 7, 2008

(30) Foreign Application Priority Data

Aug. 4, 2006 (TW) ............................... 95128602 A

(51) Int. Cl.
*G06F 1/16* (2006.01)
(52) U.S. Cl. .................................. 361/679.17; 345/156
(58) Field of Classification Search . 361/679.08–679.2; 400/682
See application file for complete search history.

(56) References Cited

U.S. PATENT DOCUMENTS

| | | | | |
|---|---|---|---|---|
| 5,510,953 A | * | 4/1996 | Merkel ................... 361/679.08 |
| 5,739,810 A | * | 4/1998 | Merkel ........................ 345/156 |
| 5,966,284 A | * | 10/1999 | Youn et al. ............. 361/679.17 |
| 6,104,604 A | * | 8/2000 | Anderson et al. ...... 361/679.55 |
| 6,212,066 B1 | * | 4/2001 | Fetterman .............. 361/679.17 |
| 6,320,743 B1 | * | 11/2001 | Jin et al. ................. 361/679.08 |
| 6,493,215 B1 | * | 12/2002 | Chiang et al. .......... 361/679.08 |
| 6,672,796 B2 | * | 1/2004 | Chiang et al. ................ 403/327 |
| 2002/0048155 A1 | * | 4/2002 | Chiang et al. ................ 361/747 |

* cited by examiner

*Primary Examiner*—Lisa Lea-Edmonds
(74) *Attorney, Agent, or Firm*—Quintero Law Office

(57) ABSTRACT

An electronic device and keyboard thereof. The electronic device comprises a body and a keyboard. The body has a recess. The keyboard comprises a base and a securing mechanism. The securing mechanism comprises a track and a sliding member. The track is disposed on the base. The sliding member selectively moves relative to the track between a first position and a second position. When the sliding member is in the first position, an extending part of the sliding member engages with the recess. When the sliding member is in the second position, the extending part separates from the recess.

14 Claims, 9 Drawing Sheets

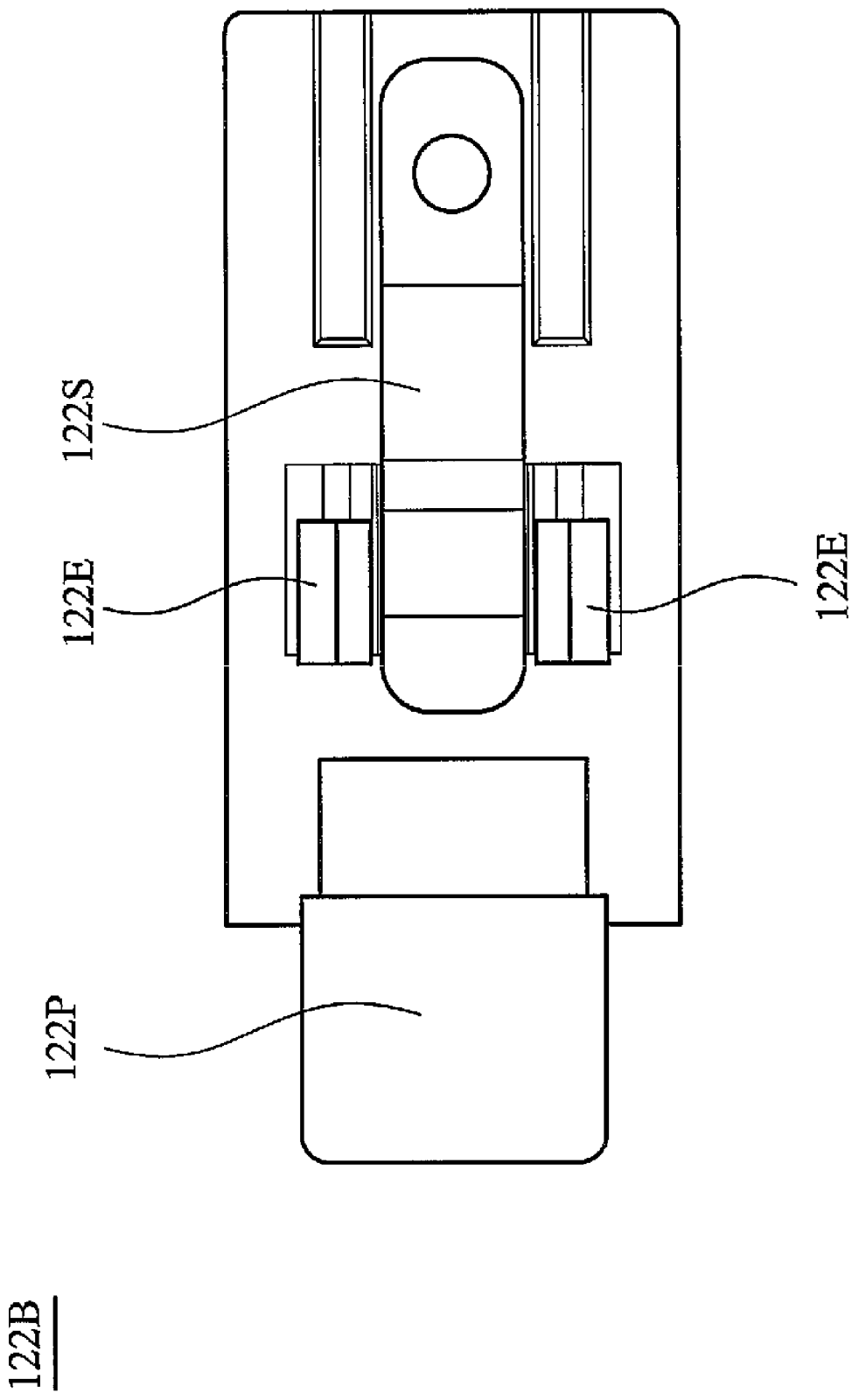

ELECTRONIC DEVICE AND KEYBOARD THEREOF

BACKGROUND OF THE INVENTION

1. Field of the Invention

The invention relates to electronic devices and removable keyboards.

2. Description of the Related Art

Referring to FIG. 1, a portable computer 1 comprises a body 2 and a keyboard 3. A conventional method to assemble the keyboard 3 and the body 2 is to screw the keyboard 3 to the interior of the body 2 by screwing members 4.

However, the keyboard 3 is screwed to the body 2 from the interior, such that the housing of the body 2 requires disassembly in order to remove the keyboard 3. Specifically, the conventional method of screwing the keyboard 3 to the body 2 causes inconvenience and complications during disassembly.

BRIEF SUMMARY OF THE INVENTION

Accordingly, the invention provides an electronic device comprising a body and a keyboard. The body has a recess. The keyboard comprises a base and a securing mechanism. The securing mechanism comprises a track and a sliding member. The track is disposed on the base. The sliding member selectively moves relative to the track between a first position and a second position. When the sliding member is in the first position, an extending part of the sliding member engages with the recess. When the sliding member is in the second position, the extending part member separates from the recess.

The invention provides another keyboard comprising a base and a securing mechanism. The securing mechanism is disposed on the base comprising a track and a sliding member. The sliding member selectively moves relative to the track between a first position and a second position. When the sliding member is in the first position, the keyboard is secured to an electronic device, and when the sliding member is in the second position, the keyboard separates from the electronic device.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 4D is a bottom view of the sliding member of the invention;

DETAILED DESCRIPTION OF THE INVENTION

Figure 1:
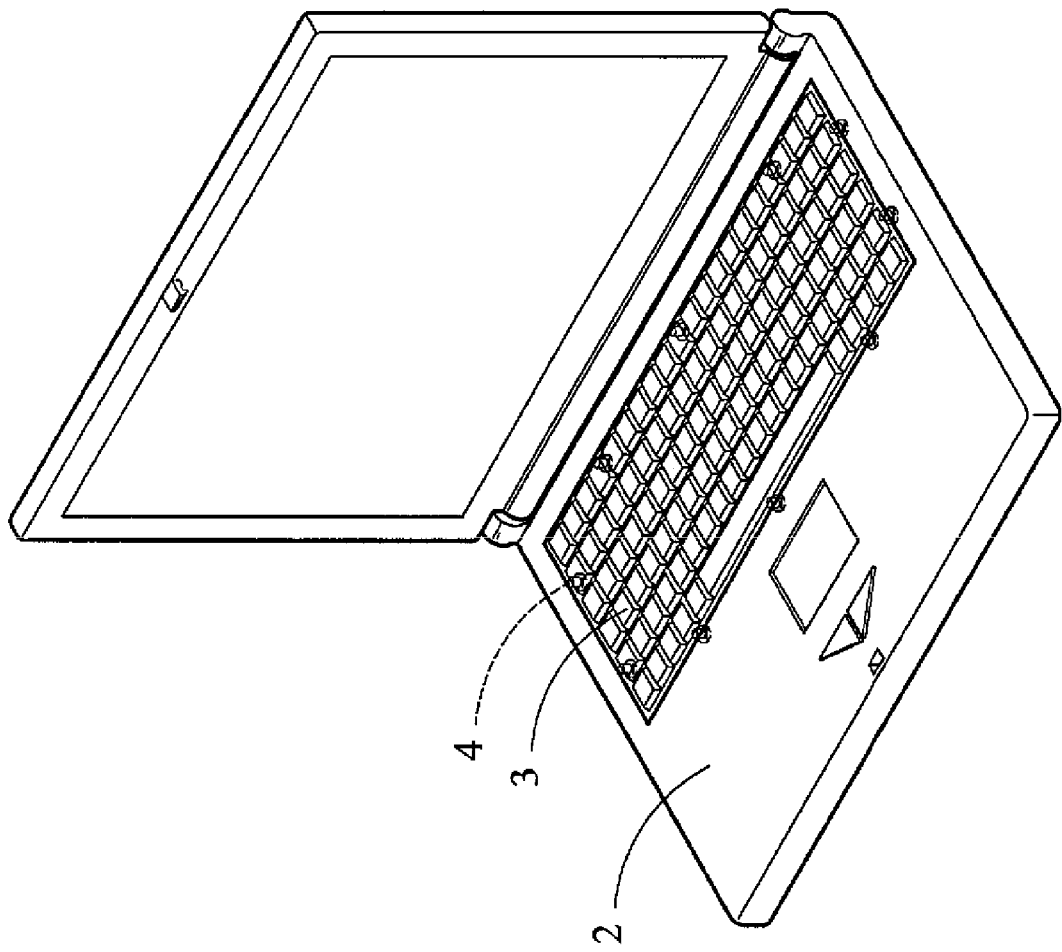
FIG. 1 is a schematic view of a conventional portable computer.
Figure 2:
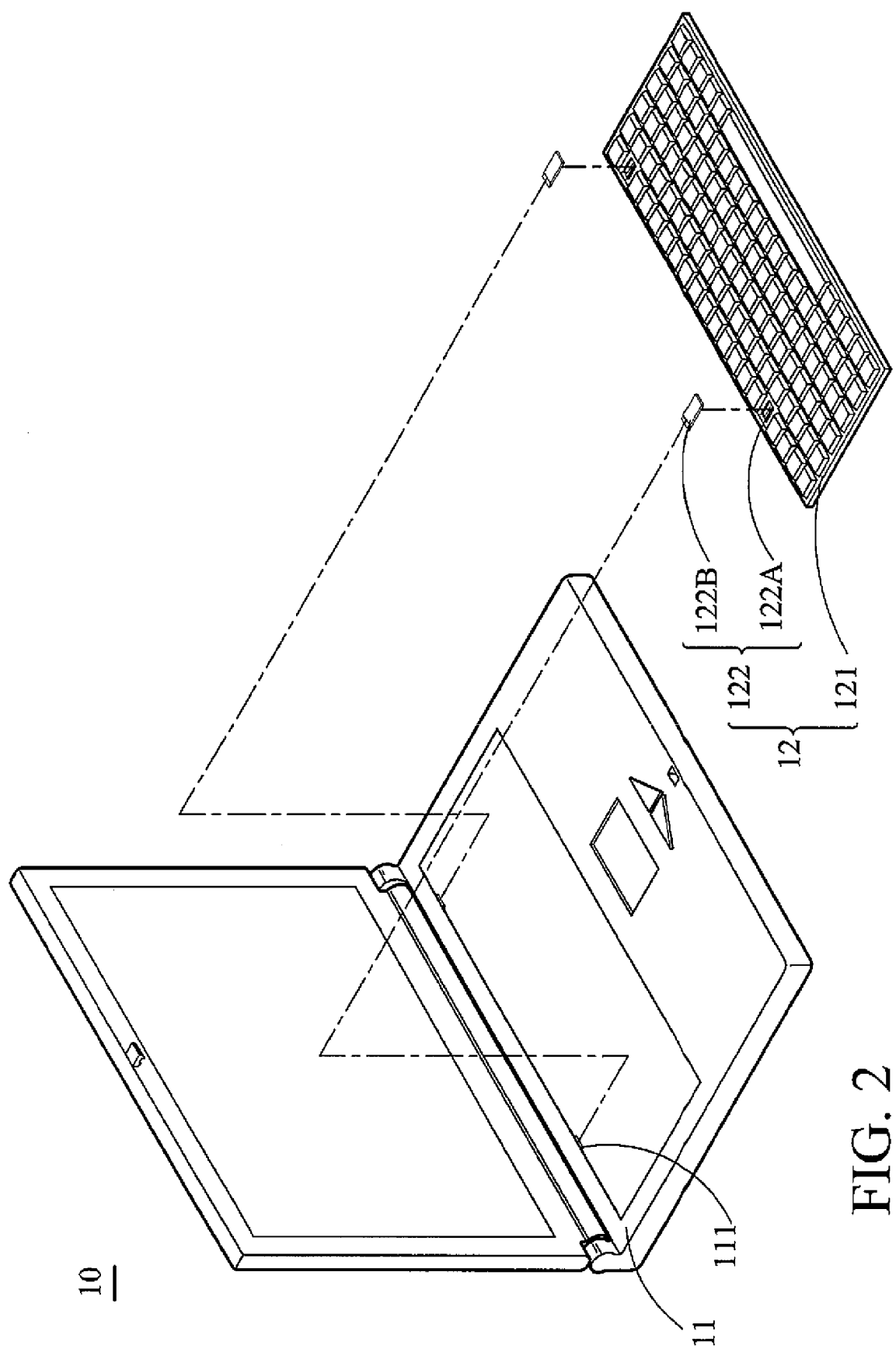
FIG. 2 is a schematic view of a portable computer of the invention.

Referring to FIG. 2, in the embodiment, the electronic device is a portable computer 10 comprising a body 11 and a keyboard 12. Although the portable computer 10 is exemplified in the embodiment, the invention encompasses all types of electronic devices which require keyboards, such as a personal digital assistance devices and electronic dictionaries etc.

The body 11 has a recess 111. The keyboard 12 comprises a base 121 and a securing mechanism 122 disposed on the top surface of the base 121, wherein the keyboard is secured to the body 11 by the securing mechanism 122.

It should be noted that the securing mechanism 122 is disposed in accordance to requirements. Therefore, the number of the securing mechanism 122 is not limited, but the corresponding recesses 111 should be disposed on the body 11 accordingly.

Figure 3A:
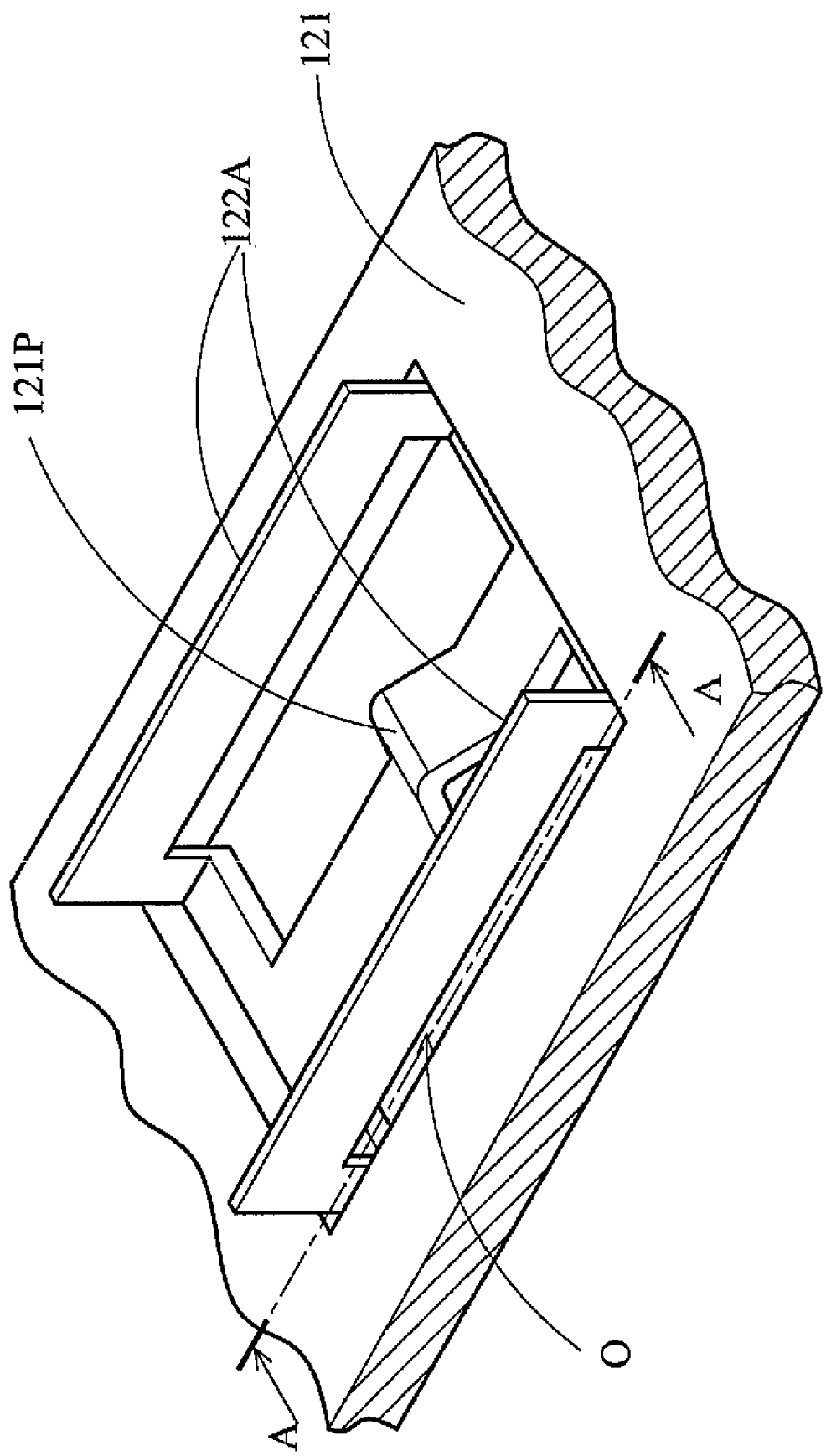
FIG. 3A is a schematic view of a base and a track of the invention.
Figure 3B:
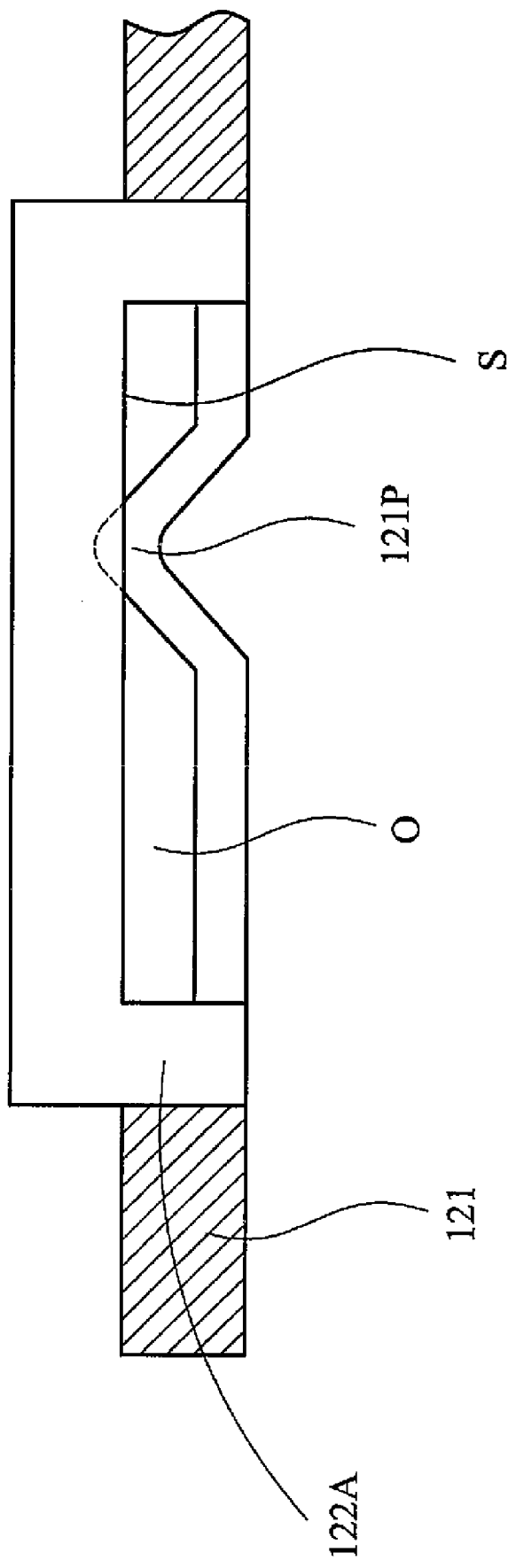
FIG. 3B is a sectional view along line A-A in the FIG. 3A.
Figure 4A:
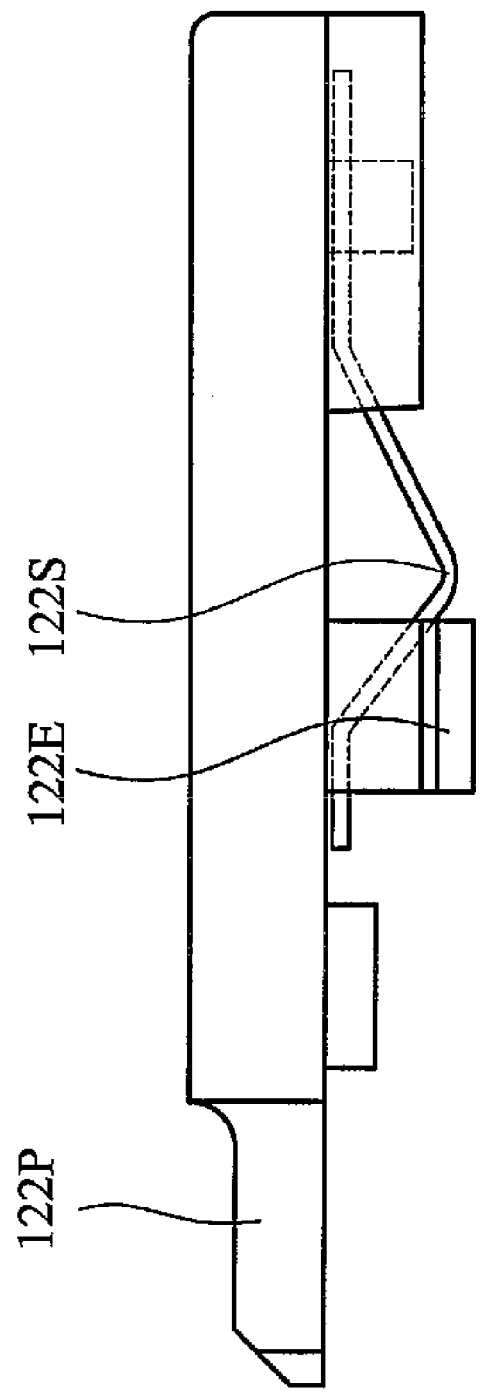
FIG. 4A is an elevation of a sliding member of the invention.
Figure 4C:
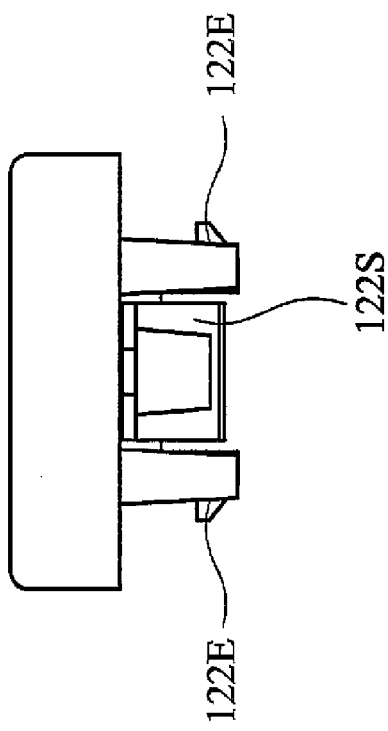
FIGS. 4B-4C are elevations of a sliding member of the invention from other perspectives.
Figure 4B:
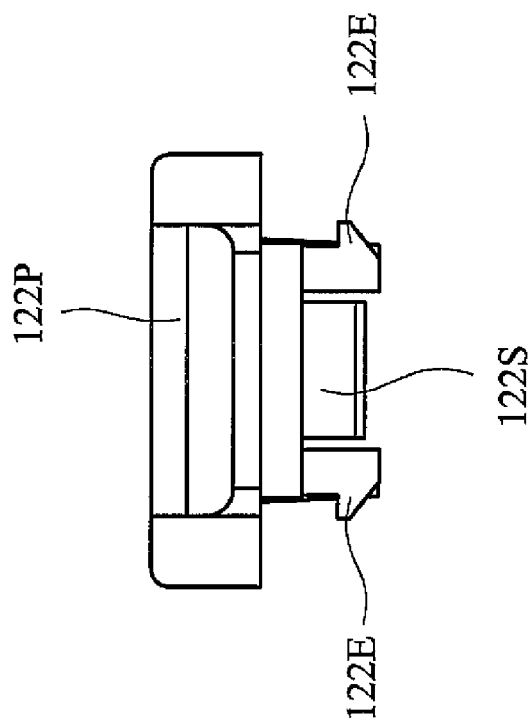

Referring to FIGS. 3A, 3B and 4A to 4D, as shown in FIGS. 3A and 4A, the base 121 has a protrusion 121P, and the securing mechanism 122 comprises two tracks 122A and a sliding member 122B. The tracks 122A, formed by stamping the base 121, are disposed on two sides of the protrusion 121P. An aperture O is formed between the base 121, the tracks 122A and the protrusion 121P. As shown in FIGS. 4B and 4C, the sliding member 122B further comprises two hooks 122E, an elastic member 122S and an extending part 122P, wherein the elastic member 122S is a V-shaped spring plate (as shown in FIG. 4A).

Figure 5A:
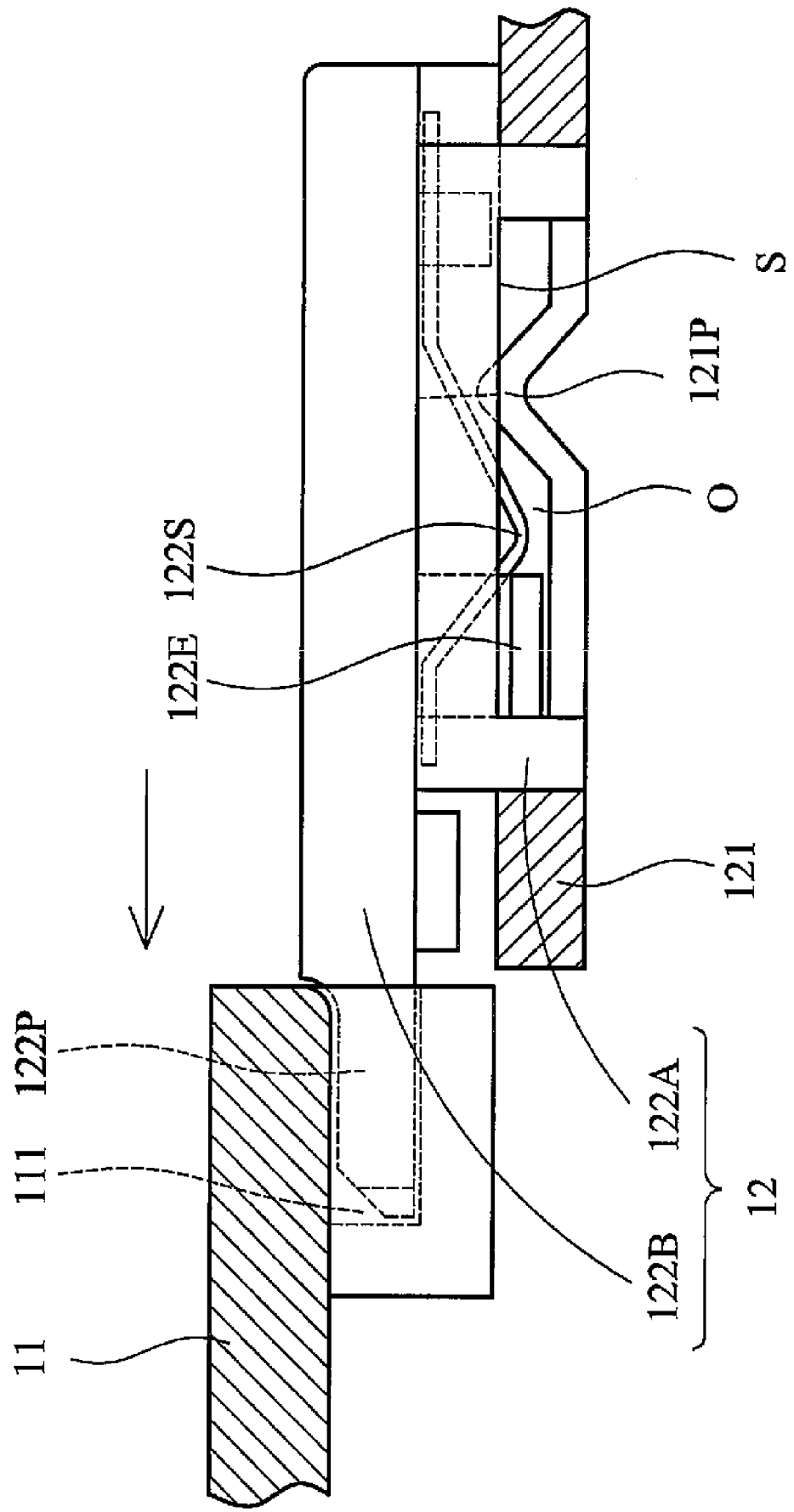
FIG. 5A is a schematic view showing the sliding member engaging the body.
Figure 5B:
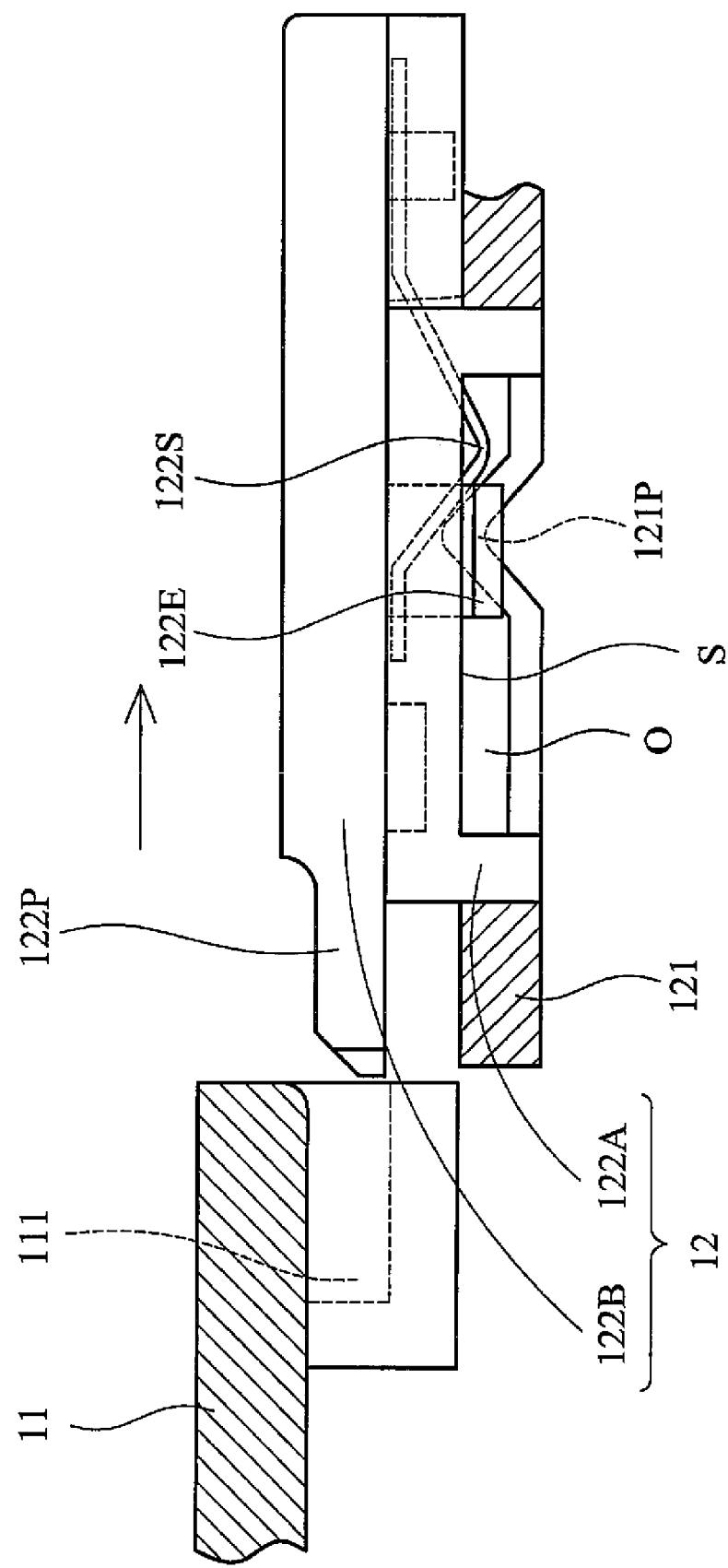
FIG. 5B is a schematic view showing the sliding member separating from the body.

Referring to FIGS. 5A and 5B, the hooks 122E of the sliding member 122B buckle with the tracks 122A, allowing the hooks 122E to abut side surfaces S of the tracks 122A and to move in the aperture O, such that the sliding member 122B is able to selectively move relative to the tracks 122A between a first position and a second position. When the sliding member 122B moves back and forth from the first position to the second position, the elastic member 122S abuts the protrusion 121P to limit the sliding member 122B, preventing the sliding member 122B from moving freely.

When the sliding member 122B moves to the first position (as shown by the arrow in FIG. 5A), the extending part 122P of the sliding member 122B engages with the recess 111 of the body 11 to secure the keyboard 12 on the body 11. When the sliding member 122B moves to the second position (as shown by arrow in FIG. 5B), the extending part 122P of the sliding member 122B separates from the recess 111 of the body 11. Meanwhile, the base 121 is raised to separate the keyboard 12 and the body 11.

The portable computer of the invention comprises an easy-assembled keyboard which can be directly mounted from the exterior of the body. A simplified securing mechanism is utilized to secure the keyboard to the body, increasing efficiency during assembly or disassembly of the portable computer.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:
   a body having a recess;
   a keyboard comprising:
   a base comprising a protrusion; and
   a securing mechanism comprising a track and a sliding member with an elastic member abutting the base;
   wherein the track is disposed on the base, the sliding member selectively moves relative to the track between a first position and a second position, when the sliding member is in the first position, an extending part of the sliding member engages with the recess, and when the sliding member is in the second position, the extending part separates from the recess;
   wherein the protrusion is disposed between the first position and the second position, and when the sliding member moves between the first position and the second position, the elastic member deforms to pass the protrusion, and is limited in the first position or the second position by the protrusion.

2. The electronic device as claimed in claim 1, wherein the sliding member further comprises a hook buckling to the track.

3. The electronic device as claimed in claim 2, wherein the securing mechanism comprises two tracks and two hooks.

4. The electronic device as claimed in claim 1, wherein when the sliding member moves from the first position to the second position, the elastic member abuts the protrusion.

5. The electronic device as claimed in claim 1, wherein the elastic member comprises a spring plate.

6. The electronic device as claimed in claim 5, wherein the spring plate is a V-shaped structure.

7. The electronic device as claimed in claim 1, wherein the track is formed by stamping the base.

8. A keyboard, comprising:
   a base comprising a protrusion; and
   a securing mechanism, disposed on the base, comprising a track and a sliding member with an elastic member abutting the base;
   wherein the sliding member selectively moves relative to the track between a first position and a second position, when the sliding member is in the first position, the keyboard is secured to an electronic device, and when the sliding member is in the second position, the keyboard separates from the electronic device;
   wherein the protrusion is disposed between the first position and the second position, and when the sliding member moves between the first position and the second position, the elastic member deforms to pass the protrusion, and is limited in the first position or the second position by the protrusion.

9. The keyboard as claimed in claim 8, wherein the sliding member further comprises a hook buckling to the track.

10. The keyboard as claimed in claim 9, wherein the securing mechanism comprises two tracks and two hooks.

11. The keyboard as claimed in claim 8, wherein when the sliding member moves from the first position to the second position, the elastic member abuts the protrusion.

12. The keyboard as claimed in claim 8, wherein the elastic member comprises a spring plate.

13. The keyboard as claimed in claim 12, wherein the spring plate is a V-shaped structure.

14. The keyboard as claimed in claim 8, wherein the track is formed by stamping the base.

* * * * *